United States Patent [19]

Lass

[11] 4,223,178
[45] Sep. 16, 1980

[54] LOCKING MEMBER FOR OUTLET BOX CABLE

[75] Inventor: John L. Lass, Homewood, Ill.

[73] Assignee: Square D Company, Palatine, Ill.

[21] Appl. No.: 68,315

[22] Filed: Aug. 20, 1979

[51] Int. Cl.² .............................................. H02G 3/08
[52] U.S. Cl. ............................... 174/65 R; 339/103 R
[58] Field of Search .............................. 174/65 R, 135; 339/103 R, 103 B, 103 C, 103 M, 107; 403/41; 24/115 R

[56] References Cited

U.S. PATENT DOCUMENTS

| | | | |
|---|---|---|---|
| 1,773,572 | 8/1930 | Calderwood | 174/65 R |
| 3,084,958 | 4/1963 | Appleton | 174/65 R X |
| 3,324,227 | 6/1967 | Maier | 174/58 X |
| 3,424,856 | 1/1969 | Coldren | 174/153 G |
| 3,493,205 | 2/1970 | Bromberg | 174/153 G X |
| 3,751,579 | 8/1973 | Nojiri | 174/153 G |
| 4,082,915 | 4/1978 | Silver | 174/65 R X |
| 4,108,527 | 8/1978 | Douty | 339/107 |

Primary Examiner—Roy N. Envall, Jr.
Assistant Examiner—D. A. Tone
Attorney, Agent, or Firm—John R. Garrett; Carmen B. Patti; Richard T. Guttman

[57] ABSTRACT

A cable lock assembly for an electrical outlet box includes first and second members that cooperate with each other to define a cable receiving opening. The first member is generally U-shaped and has a locking member extending from the base thereof, which is received into an aperture in the bottom wall of the box. The second member straddles the first member and includes a base and first and second pairs of spaced legs extending from opposite ends. Each leg of the second member is received into an opening in the bottom wall and has spaced ledges that engage the bottom surface of the bottom wall to define different sized openings between the bases.

11 Claims, 5 Drawing Figures

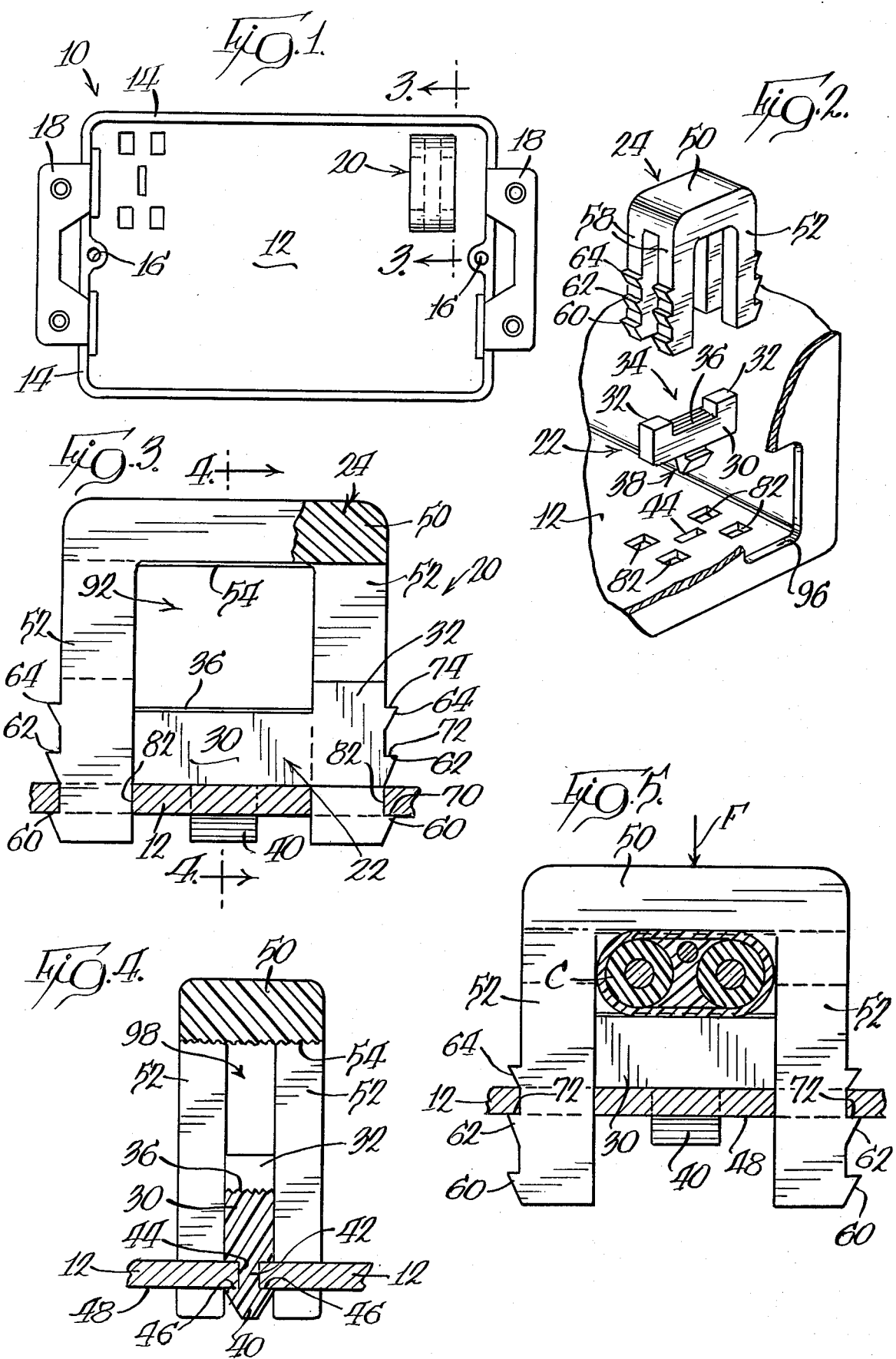

LOCKING MEMBER FOR OUTLET BOX CABLE

DESCRIPTION

1. Technical Field

The present invention relates generally to electrical outlet boxes that have electrical devices supported therein and attached to a cable extending through a hole in a wall of the outlet box and more specifically to a cable lock assembly for locking the cable within the box.

Heretofore, cable connectors for supporting a cable in components, such as outlet boxes, consisted primarily of a metal collar which had a peripheral thread and utilized a nut received on the thread to connect the collar into the outlet box. Subsequently, a second cable clamping means usually grasped the cable and cooperated with the threaded collar to retain the cable within the outlet box. Not only is such an arrangement costly in terms of manufacturing several parts, there is a tremendous labor cost of inserting the various parts into appropriate sequence within the electrical outlet box. This normally must be performed by a skilled electrician at the job site which further increases the cost.

2. Background Art

Numerous substitutes have been proposed for the conventional metallic collar and threaded nut arrangement and examples of such devices are disclosed in U.S. Pat. Nos. 3,324,227; 3,493,205; 3,751,579; and 3,424,856.

The devices disclosed in the respective patents all require a specially designed outlet box for supporting the respective components on the wall of the box.

SUMMARY OF THE INVENTION

According to the present invention, a cable lock assembly consists of two molded plastic parts that can readily be molded in a single stage mold and can be preassembled on the outlet box at the factory so that the assembly is in position to receive a cable at the job site. The assembly can lock a cable therein without utilizing any special tools in a matter of seconds.

More specifically, the cable lock assembly or securing means includes first and second members that are respectively supported in openings in the bottom wall of the outlet box and are designed such that the members can be preassembled in the outlet box at the factory and be in a position for receiving a cable through a cable receiving opening. After the cable has been received into the opening the cable can be clamped between the members merely by pushing the second member to a second position.

In the preferred embodiment of the present invention, the first member is generally U-shaped and has an elongated base with legs extending from opposite ends of the base. The base has a serrated surface between the legs and a locking element extending from an opposed surface thereof.

The second member consists of a generally rectangular base portion that is equal in length to the base of the first member and has legs extending from the four corners thereof with each leg having at least two spaced camming ledges or locking elements defined thereon with a first camming ledge of each leg defining a first plane and the second camming ledges of each leg defining a second parallel plane. The respective sets of ledges define two positions for the members with respect to each other, one of which is a cable receiving position and the second of which is a cable clamping position. Each pair of legs adjacent each end of the rectangular base portion of the second member are spaced from each other by a dimension that is substantially equal to the width of the base and legs of the first member so that the second member is confined within an elongated slot defined between the respective pairs of legs of the second member.

In preassembling the securing means on the outlet box, the locking element of the first member is forced through an aperture in the bottom wall of the outlet box and the respective legs of the second member are inserted into four openings that are equally spaced around the aperture and moved to the first position wherein the ledges of the first set of camming ledges are in engagement with the lower surface of the bottom wall of the outlet box. In this position, the two members define a cable receiving opening with the serrated surfaces located adjacent the top and the bottom of the opening.

When a cable is to be secured to the outlet box, it is only necessary for the worker to thread the cable into the opening and force the second member of the securing means to a second position wherein the cable is clamped between the two surfaces. In the second position, the serrated surfaces compress the periphery of the cable to lock it in place adjacent the bottom or floor of the outlet box.

BRIEF DESCRIPTION OF THE SEVERAL VIEWS OF THE DRAWINGS

FIG. 1 is a plan view of an outlet box having the cable lock of the present invention attached thereto;

FIG. 2 is an exploded perspective view of the components of the cable lock in conjunction with a portion of the outlet box;

FIG. 3 is a fragmentary cross-sectional view of the outlet box as viewed along line 3—3 of FIG. 1;

FIG. 4 is a cross-sectional view of the assembly, as viewed along line 4—4 of FIG. 3; and FIG. 5 is a view similar to FIG. 3 showing the cable lock in its final position with a cable clamped therein.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows an outlet box generally designated by reference numeral 10 having a cable lock assembly or securing means, generally designated by reference numeral 20, supported therein in a manner that will be described later. Electrical outlet box 10 includes a bottom wall 12 and a lurality of sidewalls 14 that define a generally rectangular space for receiving an electrical component, such as a receptacle plug. For this purpose, opposed sidewalls 14 have threaded apertures 16 defined therein for receiving screws to support the plug within the receptacle space. The opposed sidewalls 14 also have attaching elements 18 thereon so that the outlet box can be secured within a wall of a building.

The details of the cable lock or securing means 20 are illustrated in FIGS. 2 through 5 and include first and second members 22 and 24 cooperating with each other to lock a cable therebetween. First member 22 includes an elongated base 30 having a pair of legs 32 integral with opposite ends of base 30 to define a generally U-shaped upwardly opening recess 34. The exposed surface of base 30 between legs 32 has a plurality of ridges 36 defined thereon to produce a serrated surface between legs 32.

An opposed surface of base 30 has a locking element 38 extending therefrom and locking element consists of a generally trapezoidal member 40 integrally joined with base 30 by a reduced portion 42. Reduced portion 42 has a dimension substantially equal to an aperture 44 in bottom wall 12 of outlet box 10 and member 40 has aligned parallel surfaces 46 on opposite sides of the reduced portion.

The second member 24 consists of an elongated generally rectangular base 50 having a plurality of legs 52 extending from the respective corners thereof. The exposed surface of rectangular base portion 50 again has a plurality of ridges 54 located between the pairs of legs at opposite ends thereof to define a serrated surface similar to surface 36.

Each leg 52 has first, second and third integral triangular camming ledges 60, 62 and 64 vertically spaced from each other and integral with the outer peripheral surface of each of the legs. The respective sets of camming ledges or elements 60, 62 and 64 are all equally spaced from serrated surface 54 so that the horizontal surfaces 70, 72 and 74 define first, second and third parallel planes which are parallel to serrated surface 54, for a purpose that will be described later.

Referring now to FIGS. 2 and 4, it should be noted that each pair of legs 52 on the respective ends of the base 50 are spaced from each other to define an elongated slot 78 that has a width which is equal to the width of first member 22, including its base 30 and its legs 32. Thus, when the two members are assembled with respect to each other, the entire first member is confined completely within elongated slot 78 of second member 24.

To support the second member 24 on bottom wall 12 of outlet box 10, the bottom wall has a plurality of identical openings 82 equally spaced around the aperture 44 and each opening 84 is generally rectangular and is of a size that is equal to the cross section of the legs 52.

In assembling the components of the cable lock at the factory, it is only necessary for an assembly worker to apply a force onto the first member to force the enlarged traepzoidal member 40 through aperture 44 until surfaces 46 pass through the opening and engage lower surface 48 of bottom wall 12 which securely locks the first member to the bottom wall of the outlet box. The second member 24 then has its legs telescoped over the first member and a force applied to the exposed surface of base portion 50 will force the first set of camming elements or ledges 60 through the opening so that the surfaces 70 are in engagement with the lower surface 48 of bottom wall 12. It should be noted that the spacing between the upper and lower edges of each of the camming elements 60, 62 and 64 is substantially equal to the thickness of bottom wall 12 so that in the first position illustrated in FIG. 3, the lower edge of the second set of camming elements 62 is in engagement with the upper surface of the bottom wall 12 which will hold the surfaces 70 of the first set of camming elements 60 in engagement with the lower surface of bottom wall 12. In this position, the two members cooperate with each other to define a cable receiving opening 92 that is substantially larger than the diameter of the largest cable, such as a Romax cable, which can easily be threaded through the opening 92. The position of the members 22 and 24 illustrated in FIG. 3 is the position that the cable lock assembly and the electrical outlet box 10 would be shipped from the factory to an ultimate installer.

In order to securely lock the cable into the outlet box at the point of insulation, it is only necessary for the installer to thread a cable C through a knock-out hole 96 aligned with opening 92 and thread the desired length of cable through the opening 92. When the desired length of cable has been threaded into the outlet box, it is only necessary for the installer to apply a force F on the exposed surface of base portion 50, and the second member will be moved towards the first member a sufficient distance so that the second set of camming ledges 62 are forced through the openings 82. During such movement from the position illustrated in FIG. 3 to the position illustrated in FIG. 5, the serrated surfaces 36 and 54 bite into the insulation of cable C and securely clamp the cable to outlet box 10. In the second position illustrated in FIG. 5 the upper surfaces 72 of the second set of camming elements or ledges 62 are retained in engagement with the lower surface 48 by the expansion force supplied by the cable C to the first and second members.

The third set of camming elements 64 are provided to accommodate cables of different size while still being capable of securely clamping the cable between the respective serrated surfaces 36 and 54. In most cases, the third set of camming elements 64 would not be necessary since most wire that is utilized in commercial or residential establishments is of a standard size.

Of course, numerous modifications come to mind without departing from the spirit of the invention. If desired, locking element 38 could be eliminated and could still be maintained in position with respect to the second member and the outlet box by enlarging the intermediate portion of the base 30 so that it would be slightly wider than the width of slot 78. With this modification, the enlarged portion of base 30 would have a length equal to the spacing between the respective pairs of legs, as seen in FIG. 3, to prevent endwise movement of the two members with respect to each other in the preassembled condition. With this arrangement, legs 32 could also be eliminated to further simplify the manufacture of this component.

Endwise movement could also be controlled by having the inner adjacent surfaces of the respective pairs of legs angularly related to each other and having opposed surfaces of opposite ends of base 30, without legs 32, equally angularly related. For example, base 30 could have a reducing taper in each direction from the center to opposite ends and the inner surfaces of the respective pair of legs 52 would be inclined to define the same taper angle as the opposed surfaces.

As can be appreciated from the above description, the present invention provides an extremely simple and inexpensive manner of permanently securing a cable within an outlet box which requires only two components that could readily be injection molded at very little cost. The two members can be preassembled into the outlet box at the factory and the cable can be clamped between the members at the site of installation without the use of any tools while still providing sufficient gripping force to meet all standards in the electrical industry.

What is claimed is:

1. In an electrical outlet box having a bottom wall and sidewalls defining a receptacle space with a sidewall having a knock-out hole for receiving an electrical cable and securing means for retaining said cable, said securing means including a first member having a recess generally aligned with said hole and having a serrated surface at the base of said recess, said first member having a locking element extending from a surface therof and one wall of said box having an aperture receiving said locking element to secure said first member to said box, said one wall having a plurality of additional openings surrounding said aperture, a second member having a base portion and a plurality of legs extending from said base portion and equal in number to said additional openings, said second member cooperating with said first member to define a cable receiving opening aligned with said knock-out hole, each of said legs having a first camming ledge defining a space between said members for freely receiving said cable and a second camming ledge for locking said cable between said serrated surface and said base portion.

2. An outlet box as defined in claim 1, in which said legs are spaced from each other and cooperate to define an elongated slot having a width equal to the width of said first member so that said second member encompasses said first member.

3. An outlet box as defined in claim 2, in which said first member has a pair of legs extending from opposite edges of said serrated surface with each leg being positioned between a pair of legs of said second member.

4. An outlet box as defined in claim 1, in which each leg has a third camming ledge spaced from said second camming ledge to accommodate clamping cables of different diameter between said members.

5. An outlet box as defined in claim 1, in which said locking element includes a trapezoidal member connected to the center of said base by an integral reduced portion received into said opening in said one wall with said trapezoidal member having aligned parallel surfaces on opposite sides of said reduced portion engaging an outer surface of said one wall.

6. In combination with an electrical box having a bottom wall and sidewalls with one of said sidewalls having a knock-out hole for receiving an electrical cable, and non-metallic securing means for securing said cable in said box, said securing means including a first U-shaped member having an elongated base and integral legs extending from one surface on opposite ends of said base with said one surface being serrated between said legs, a locking element extending from an opposed surface of said elongated base with said bottom wall having an aperture receiving said locking element, a second elongated member including a rectangular base portion having a leg extending from each corner of a serrated surface, each leg having at least two spaced camming elements, said bottom wall having four openings equally spaced around said aperture into which said legs are receiving, said members cooperating to define a cable receiving opening when a first set of camming elements is in engagement with a lower surface of said bottom wall and said serrated surfaces cooperating with each other to clamp said cable when a second set of camming elements engages said lower surface.

7. The combination as defined in claim 6, in which each pair of legs on each end of said rectangular base portion is spaced by a dimension substantially equal to the width of said first member and said elongated base of said first member is equal in length with the length of said rectangular base portion so that said legs of said first member are supported between the legs of said second member.

8. The combination as defined in claim 7, in which each leg of said second member has a third camming element to accommodate clamping cables of different diameters.

9. In an electrical outlet box having a bottom wall and sidewalls defining a receptacle space with one sidewall having a knock-out hole for receiving a cable and securing means for retaining said cable in said space, said securing means including an elongated rectangular base having a leg extending from each corner thereof, said bottom wall having an opening for each leg into which said legs are received, each leg having first and second spaced camming elements having flat surfaces extending parallel to said bottom wall and adapted to engage a bottom surface, said camming elements having adjacent edges spaced by a dimension substantially equal to the thickness of said bottom wall, said parallel surfaces of said first camming elements defining a first plane and said second parallel surfaces defining a second plane extending parallel to said first plane, each pair of legs on opposite ends of said base being spaced from each other to define an elongated slot, and an elongated cooperating member retained in said slot, said members cooperating to define a cable receiving opening when said flat surfaces of said first camming elements engage a bottom surface of said bottom wall and clamp, a cable therebetween when said flat surfaces of said second camming elements engage said bottom surface.

10. An electrical outlet box as defined in claim 9, further including means on said cooperating member for preventing longitudinal movement with respect to said rectangular base.

11. An electrical outlet box as defined in claim 10, in which said means includes a locking element extending therefrom with said bottom wall receiving said locking element.

* * * * *